US011518893B2

(12) United States Patent
Sheerin et al.

(10) Patent No.: US 11,518,893 B2
(45) Date of Patent: Dec. 6, 2022

(54) MANUFACTURING METHOD FOR MULTI PAINT FINISHES AND A MULTI-FINISH EXTENDER GRIND

(71) Applicant: Columbia Insurance Company, Omaha, NE (US)

(72) Inventors: Robert J. Sheerin, North Caldwell, NJ (US); Navin Tilara, Roseland, NJ (US); Michael Bochnik, Yonkers, NY (US); Gregory Molfetta, Bridgewater, NJ (US)

(73) Assignee: Columbia Insurance Company, Omaha, NE (US)

(*) Notice: Subject to any disclaimer, the term of this patent is extended or adjusted under 35 U.S.C. 154(b) by 204 days.

(21) Appl. No.: 16/196,051

(22) Filed: Nov. 20, 2018

(65) Prior Publication Data
US 2020/0157363 A1 May 21, 2020

(51) Int. Cl.
*C09D 7/61* (2018.01)
*C09D 17/00* (2006.01)
*C08K 3/26* (2006.01)
*C08K 3/34* (2006.01)

(52) U.S. Cl.
CPC .............. *C09D 7/61* (2018.01); *C09D 17/00* (2013.01); *C09D 17/001* (2013.01); *C09D 17/004* (2013.01); *C08K 3/34* (2013.01); *C08K 2003/265* (2013.01)

(58) Field of Classification Search
CPC ........ C09D 17/00; C09D 17/61; C09D 17/62; C09D 17/001; C08K 3/34; C08K 3/36; C08K 2003/265
See application file for complete search history.

(56) References Cited

U.S. PATENT DOCUMENTS

| 2,878,135 | A | * | 3/1959 | Willis | C09D 17/002 |
| | | | | | 106/499 |
| 3,210,209 | A | * | 10/1965 | Jones | C09D 17/002 |
| | | | | | 106/253 |
| 3,826,777 | A | * | 7/1974 | Thomas et al. | C08F 263/08 |
| | | | | | 524/437 |
| 5,100,435 | A | * | 3/1992 | Onwumere | D01D 5/0985 |
| | | | | | 156/167 |
| 5,198,408 | A | * | 3/1993 | Martin | B41M 5/42 |
| | | | | | 428/327 |
| 5,385,960 | A | * | 1/1995 | Emmons | C09C 1/3676 |
| | | | | | 523/205 |
| 5,643,669 | A | | 7/1997 | Tsuei | |
| 5,672,649 | A | | 9/1997 | Brock et al. | |
| 6,074,474 | A | * | 6/2000 | Broome | C09D 5/028 |
| | | | | | 106/401 |
| 6,214,467 | B1 | * | 4/2001 | Edwards | C08F 265/04 |
| | | | | | 428/407 |
| 6,221,145 | B1 | | 4/2001 | McClain | |
| 6,531,537 | B2 | | 3/2003 | Friel et al. | |
| 7,250,464 | B2 | | 7/2007 | Friel et al. | |
| 7,339,000 | B1 | | 3/2008 | McClain et al. | |
| 7,435,777 | B2 | | 10/2008 | Bochnik et al. | |
| 7,547,740 | B2 | | 6/2009 | Yang et al. | |
| 7,589,158 | B2 | | 9/2009 | Yang et al. | |
| 7,642,314 | B2 | | 1/2010 | Gharapetian et al. | |
| 7,754,801 | B2 | | 7/2010 | Sheerin et al. | |
| 7,919,546 | B2 | | 4/2011 | Trevino, III et al. | |
| 8,092,909 | B2 | * | 1/2012 | Yong | B05D 7/54 |
| | | | | | 428/411.1 |
| 8,507,579 | B2 | | 8/2013 | Sheerin et al. | |
| 8,530,591 | B2 | | 9/2013 | Yang et al. | |
| 8,815,981 | B2 | | 8/2014 | Yang et al. | |
| 8,895,658 | B2 | | 11/2014 | Dandreaux et al. | |
| 9,115,265 | B2 | | 8/2015 | Yang et al. | |
| 9,453,133 | B2 | | 9/2016 | Dandreaux et al. | |
| 9,499,680 | B2 | | 11/2016 | Yang et al. | |
| 9,505,922 | B2 | | 11/2016 | Gharapetian et al. | |
| 9,588,800 | B2 | | 3/2017 | El-Kersh et al. | |
| 9,934,460 | B2 | | 4/2018 | Enguent et al. | |
| 9,994,722 | B2 | | 6/2018 | Sheerin et al. | |
| 2002/0013401 | A1 | * | 1/2002 | Friel | C09J 201/00 |
| | | | | | 524/501 |
| 2002/0026885 | A1 | * | 3/2002 | Saquet | C09D 7/20 |
| | | | | | 106/311 |
| 2002/0107311 | A1 | * | 8/2002 | Sweitzer | C09D 5/02 |
| | | | | | 524/35 |
| 2002/0198293 | A1 | * | 12/2002 | Craun | C09D 7/69 |
| | | | | | 524/47 |
| 2008/0058473 | A1 | | 3/2008 | Freidzon et al. | |
| 2010/0062219 | A1 | * | 3/2010 | Richards | C04B 41/52 |
| | | | | | 428/142 |
| 2019/0085184 | A1 | * | 3/2019 | Cobb | C09D 7/61 |

FOREIGN PATENT DOCUMENTS

| EP | 0937760 A1 * | 8/1999 | ............. C09D 17/00 |
| WO | WO-2020044247 A1 * | 3/2020 | ............. C09D 5/00 |

OTHER PUBLICATIONS

Universal Selector, UCAR 379, 2020, 2 pages.*
Boke, Jason Wai Pan. "Calcium Carbonate Particle Size Effects on Titanium Dioxide Light Scattering in Coatings." Jun. 2013.
"Extenders." PCI Paint & Coatings Industry Magazine, Feb. 26, 2001. www.pcimag.com/articles/84133-extenders.

(Continued)

*Primary Examiner* — Brieann R Johnston
(74) *Attorney, Agent, or Firm* — The H.T. Than Law Group

(57) ABSTRACT

Disclosed herein are a more efficient method for manufacturing paints and a universal extender pigment grind that can be used for the paints in the same paint line as well as in different paint lines, while producing paints with similar properties as paints manufactured under traditional manufacturing techniques. The universal extender pigment grind comprises a minimum amount of diatomaceous earth.

26 Claims, 2 Drawing Sheets

(56) References Cited

OTHER PUBLICATIONS

Alua, Pedro Miguel. "Opacity Optimization of Waterborne Paints." Jul. 2012. Universidade Technica de Lisboa.
Bumiller, Mark. "Dispersing Powders in Liquid." Horiba. 2013.

\* cited by examiner

MANUFACTURING METHOD FOR MULTI PAINT FINISHES AND A MULTI-FINISH EXTENDER GRIND

FIELD OF THE INVENTION

The present invention relates to a method for simplifying the manufacturing of multiple paint finishes and multiple tint bases for multiple paint lines. The present invention also relates to a universal or near-universal extender grind that can be mixed with an opacifying grind and the film-forming latex resin to form multiple paint finishes and multiple tint bases for multiple paint lines.

BACKGROUND OF THE INVENTION

At the paint manufacturing facility or factory, each finish (e.g., flat, matte, eggshell, satin, semi-gloss) and each tint base (e.g., white, pastel/light, medium/mid-tone or deep) of each paint line (e.g., Regal™, Ben™, Aura™, Natura™, etc.) has its own paint formulation, which includes a pigment grind with an opacifying pigment such as $TiO_2$ and a specific extender pigment or combination of extender pigments and let down with one or more polymer latex film-forming resins. Opacifying pigments have high refractive index and function to hide the colors or markings on the substrate that the paint composition covers. Lower refractive index pigments such as extender pigments increase the pigment volume of a paint and modify various properties of paints and paint films. See "Calcium Carbonate Extender Pigments," by Herbert Siesholtz and Leonard Cohan, Ind. Eng. Chem., 41(2), 390-395 (1949). Extender pigments can be used to reduce the amount of $TiO_2$ in the formulation to reduce costs, and can be specifically selected to impart certain properties, such as sheen/finish, and to modify the critical pigment volume (CPV), hardness/scrub-ability, etc. to the dried paint film. The effects of extender pigments in paints are discussed in "Extenders", PCI Paint & Coatings Industry Magazine, Feb. 26, 2001, available at www.pcimagcom/articles/84133-extenders, which is incorporated herein by reference in its entirety.

One paint line, e.g., Regal™, may have 20 different formulations to be used at the factory, i.e., five finishes×four tint bases. Two paint lines, e.g., Regal™ and Ben™, may have 40 different formulations. Three paint lines, e.g., Regal™, Ben™ and Aura™, may have 60 different formulations. A paint factory may manufacture up to 20 or more paint lines, which may have up to 400 unique paint formulations or more. Paint lines include both interior and exterior paints.

Moreover, the combinations of extender pigments can be complex and unpredictable from one paint formulation to another paint formulation. In one example, one eggshell, white tint base paint may have an extender combination of nepheline syenite, potassium carbonate, multifunctional silica, silica and alumina. An eggshell, clear tint base paint may have silica and alumina. A matte, white tint base paint may have potassium carbonate, nepheline, diatomaceous earth and multifunctional silica. Similar extenders produced by different manufacturers may contain small amounts of impurities or other unknown components that can affect the extenders' properties or how they react within paint compositions, which add another layer of complexity. As used herein, extenders and extender pigments have the same meaning.

A paint factory must follow hundreds of different formulations and must store the various extender pigments indicated in the many formulations. This technique had led to a decrease in operational efficiency and an increase in costs and complexity of storage of multiple extender pigments on site.

The patent literature describes earlier attempts to simplify the manufacturing of paints, not at the factories but at the small-scale, retail level. These references teach various pre-paints or modules that are mixed at the point of sale on-demand to make paints for individual purchasers. These references are summarized in commonly owned U.S. Pat. No. 9,994,722, which is also published as international patent application publication No. WO2017/053190A1 and which is incorporated by reference herein in its entirety. The '722 patent teaches a system and method for adjusting factory-manufactured paints at the points of sale or points of use by adjusting the paints' sheen or finishes by using a gloss enhancer and/or flattening agent.

One of these pre-paint references is U.S. Pat. No. 6,531,537 to Friel et al. Friel teaches a point of sale paint manufacturing technique, which has three principal pre-paints: (i) opacifying pre-paint, (ii) extender pre-paint, and (iii) binder pre-paint. Properties of the paint, such as sheens/finishes, tint bases, etc., can be varied at the point of sale when these three pre-paints are mixed with one or more of the same pre-paints. Friel acknowledges that point of sale manufacturing has its drawbacks, including inconsistent key properties of paints, such as viscosity, gloss or color. Friel proposes to test for the key properties through feedback loops in the paint making machine to ensure that these properties are controlled.

U.S. Pat. No. 6,221,145 to McClain and its progenies, i.e., subsequent cases that claims priority thereto, disclose manufacturing paints at the point of sale by mixing four pre-paints, including (a) pigment module, (b) dispersant thickener/diluent module, (c) low resin module and (d) high resin module. The low resin module contains a number of extender pigments as well as resin and the pigment module may contain small amount of resin. Progeny U.S. Pat. No. 7,339,000 to McClain et al further explains that the four modules can be varied to produce various color bases so that they are suitable for use to make different paint colors. Progeny U.S. Pat. No. 7,919,546 to Trevino et al adds an extender pre-paint and teaches that the pre-paints can be varied to produce paints with various tint bases so that they are suitable to form different types of color paints. Trevino also discloses that every formula or recipe for every base paints can be entered into a database for the retail paint production apparatus to produce all the paints that can be produced at the factories.

U.S. Pat. No. 5,672,649 to Brock et al discloses five or more modules for making special effect paints, including (a) special effect module, (b) binder module, (c) dye module, (d) rheology module and (e) cross-linking module. Four modules contain various binders and the fifth module may also contain binder. The special effect module and the dye module contain pigments.

However, the methodologies described in these pre-paint references have not simplified paint manufacturing process at the point of sale, retail level or at the factory level. The majority of retail paint stores do not manufacture paint on site and none is known to the present inventors. Paint factories still rely on hundreds of different paint formulations and store scores of extender pigments on site for their production needs.

Moreover, paint factories still grind or mix dry opacifying pigments and dry extender pigments with water, surfactants, dispersants and other additives into slurries or wet grinds to make paints while consuming additional energy, wasting production time and emitting excess green-house gases. A conventional paint formulation is as follows. All weights are in grams.

Pigment Grind:

| | |
|---|---|
| Propylene Glycol | 10.8 |
| Water | 104.5 |
| Biocide 1 | 1.5 |
| Antimicrobial 1 | 1.9 |
| Dispersant/Surfactant 1 | 7.7 |
| Potassium carbonate | 1.7 |
| Titanium dioxide pigment | 232.1 |
| Extender Pigment 1 | 37.1 |
| Extender Pigment 2 | 25.5 |
| Extender Pigment 3 | 34.8 |
| Extender Pigment 4 | 8.5 |
| Extender Pigment 5 | 8.5 |
| Defoamer 1 | 0.7 |

Thereafter, the pigment grind is letdown or admixed with the aqueous film-forming resin composition.

Letdown:

| | |
|---|---|
| Phosphate Ester Surfactant 2, Ammonium Salt (25%) | 1.5 |
| Nonionic Surfactant 3 | 3.5 |
| Nonionic surfactant 4 | 0.8 |
| Anionic Surfactant 1 (60%) | 1.5 |
| Coalescent | 13.2 |
| Acrylic Latex with/without Crosslinking Functionality | 321.1 (~50% solids) |
| Polyurethane resin | 19.3 |
| Hydrophobically modified polyether rheology modifier | 18.6 |
| Hydrophobically modified polyethylene oxide urethane | 7.0 |
| Defoamer 2 | 2.3 |
| Defoamer 3 | 2.3 |
| Water | 33.1 |

As shown above, dry opacifying pigment such as titanium dioxide is mixed under agitation with a plurality of dry extender pigments along with dispersant/surfactant, biocides and other additives for each individual paint formulation. This opacifying and extender pigment grind is then admixed with the aqueous film-forming resin composition along with an optional second film-forming resin and various other additives such as surfactants, rheological modifiers, optional coalescent aids and defoamers. Each of the hundreds of paint formulations is similar to the above exemplary formulation. Having to make hundreds of such paint formulations would challenge any effort to improve efficiency and to reduce costs at the paint factories.

Hence, there remains a need to improve the efficiency and reduce the complexity and costs of manufacturing at the paint factories.

SUMMARY OF THE INVENTION

An embodiment of the present invention is directed to the manufacturing of various grades or qualities of paints, e.g., economical, contractor and premium grades, in all finishes and tintable bases. The paint manufacturer may control three main or coarse levers: (i) the amount of opacifying pigment grind, which control the tintable bases, (ii) the type of the latex film-forming resins, which can be all acrylic or vinyl acrylic, etc. and which controls the grade or quality of the commercial paint lines, and (iii) the amount of universal extender grind, which controls the sheen or finishes and some hiding.

Within the third control lever, the present inventors have discovered that a minimum amount of diatomaceous earth (DE) extender pigment allows the inventive manufacturing method to produce all finishes and tintable bases across all paint lines. Aluminum silicate can vary the amount of hiding and/or whiteness of the paint film. The amount of aluminum silicate can be controlled to maintain the lower level of contrast ratio of higher tintable bases, and the high level of contrast ratio for the 1-base tintable paints. Calcium carbonate or another suitable extender provides a low cost, easy to disperse and some flattening effect due to its plate-like shape. Calcium carbonate can help a paint composition to achieve the desired or necessary pigment volume concentration. Other extender pigments can be included in addition to the three discussed above or to replace aluminum silicate or calcium carbonate. DE at the minimum amount should be present in the universal extender pigment grind.

The diatomaceous earth should be present at a lower limit of more than about 6.5 wt. % of the total weight of the universal extender grind including water. Preferably the DE should be present at more than about 7% of the total weight of the universal extender grind. The DE can present to an upper limit of about 15% or higher of the total weight of the universal extender grind. The range of DE can be anywhere between the lower limit and the upper limit stated above in increments of about 0.5 wt. %. For example, the range of DE can be between about 6.5 wt. % and 15 wt. %, or between 8.5 wt. % and 10.0 wt. %, or between 8 wt. % and 8.5 wt. %, or between 11 wt. % and 12.5 wt. %, etc.

Aluminum silicate preferably ranges from about 15 wt. % to about 30 wt. % of the grind. A lower amount from about 15 wt. % to about 20 wt. %, preferably from about 16 wt. % to about 19 wt. % or preferably from about 17 wt. % to about 18 wt. % of aluminum silicate is preferred for 3-base and 4-base tintable paints, as well as for 2-base. A higher amount from about 25 wt. % to about 30 wt. %, preferably from about 26 wt. % to about 29 wt. % or preferably from about 27 wt. % to about 28 wt. % of aluminum silicate is preferred for 1-base tintable paints.

Calcium carbonate can make up the remaining amount of extender or most of the remaining extender. Preferably, calcium carbonate comprises from about 8 wt. % to about 30 wt. % of the grind, preferably from about 9 wt. % to about 25 wt. % or from about 10 wt. % to about 20 wt. %.

The third control lever or the universal extender grind may have less than 3 wt. % of resin and/or film forming resin and less than about 10 wt. % of other extenders or impurities, as discussed above.

An embodiment of the present invention is directed to a method for manufacturing a plurality of paint compositions comprising paints having different tintable bases and different glosses or finishes, said method comprises the steps of:

(a) optionally selecting and transporting one of a plurality of aqueous opacifying pigment grinds into a mixing tank;

(b) transporting an aqueous universal extender grind into the mixing tank;

(c) selecting and transporting one of a plurality of aqueous film-forming resin solutions into the mixing tank;

(d) adding at least one additive to the mixing tank; and (e) mixing all transported components in the mixing tank to manufacture said plurality of paint compositions, wherein said universal extender grind is used in manufacturing the plurality of paint compositions, and wherein said universal extender grind comprises from about 6.5 wt. % to about 15 wt. % of diatomaceous earth and from about 15 wt. % and 30 wt. % of aluminum silicate.

The universal extender solution may further comprise a calcium carbonate extender pigment.

Step (a) may further comprise the step of affirmatively transporting another one of the plurality of the aqueous opacifying pigment grinds to the mixing tank. Step (c) may further comprise the step of transporting another one of the plurality of the aqueous film-forming resin solutions to the mixing tank.

In one embodiment, the universal extender grind may comprise about 15 wt. % to about 20 wt. % of aluminum silicate. In this embodiment, preferably the at least one additive comprises an aqueous solution of aluminum silicate. In another embodiment, the universal extender grind comprises about 25 wt. % to about 30 wt. % of aluminum silicate.

The plurality of paint compositions comprising paints having different tintable bases and different glosses or finishes preferably include paint compositions from a plurality of paint lines.

Another embodiment of the present invention is directed to a universal grind of extender pigments, which is adapted to be used to manufacture a plurality of paint compositions, comprising a diatomaceous earth pigment, wherein said universal extender grind comprises from about 6.5 wt. % to about 15 wt. % of diatomaceous earth and from about 15 wt. % and 30 wt. % of aluminum silicate, an aluminum silicate pigment, wherein said universal extender grind comprises from about 15 wt. % and 30 wt. % of aluminum silicate, and a calcium carbonate pigment, wherein various amounts of said universal grind are admixed with an optional opacifying pigment grind and an aqueous film forming resin solution to manufacture the plurality of paint compositions to adjust the gloss or sheen of the plurality of paint compositions, and wherein the plurality of paint compositions comprise paints having different tintable bases and different glosses or finishes.

The universal grind of extender pigments may comprise from about 7 wt. % to about 15 wt. % of diatomaceous earth, from about 8 wt. % to about 14 wt. % of diatomaceous earth, or from about 9 wt. % to about 13 wt. % of diatomaceous earth.

The universal grind of extender pigments may comprise from about 15 wt. % to about 20 wt. % of aluminum silicate, from about 16 wt. % to about 19 wt. % of aluminum silicate or from about 17 wt. % to about 18 wt. % of aluminum silicate.

The universal grind of extender pigments may comprise from about 25 wt. % to about 30 wt. % of aluminum silicate, from about 26 wt. % to about 29 wt. % of aluminum silicate, or from about 27 wt. % to about 28 wt. % of aluminum silicate.

The universal grind of extender pigments may also comprise from about 8 wt. % to about 30 wt. % of calcium carbonate, from about 9 wt. % to about 25 wt. % of calcium carbonate, or from about 10 wt. % to about 20 wt. % of calcium carbonate. The universal grind of extender pigments may also comprise less than about 5 wt. % of polymeric resin.

It is noted that the inventive plurality of paint compositions comprise paint compositions having full-range tintable bases, full-range glosses or finishes and full-range of qualities, resins and costs/pricing. The inventive plurality of paint compositions do not include paint compositions that do not utilize the universal extender grind as described or claimed herein. The paint factory may produce certain paint compositions using the traditional extender practice or by special orders, or some paint lines may include paints especially at higher glosses that do not utilize said universal extender grind; such paints are outside of the present invention. The present invention covers paint compositions that are produced by the claimed process and that incorporate the claimed universal extender grind.

BRIEF DESCRIPTION OF THE DRAWINGS

In the accompanying drawings, which form a part of the specification and are to be read in conjunction therewith and in which like reference numerals are used to indicate like parts in the various views.

DETAILED DESCRIPTION OF THE PREFERRED EMBODIMENTS

Figure 1:
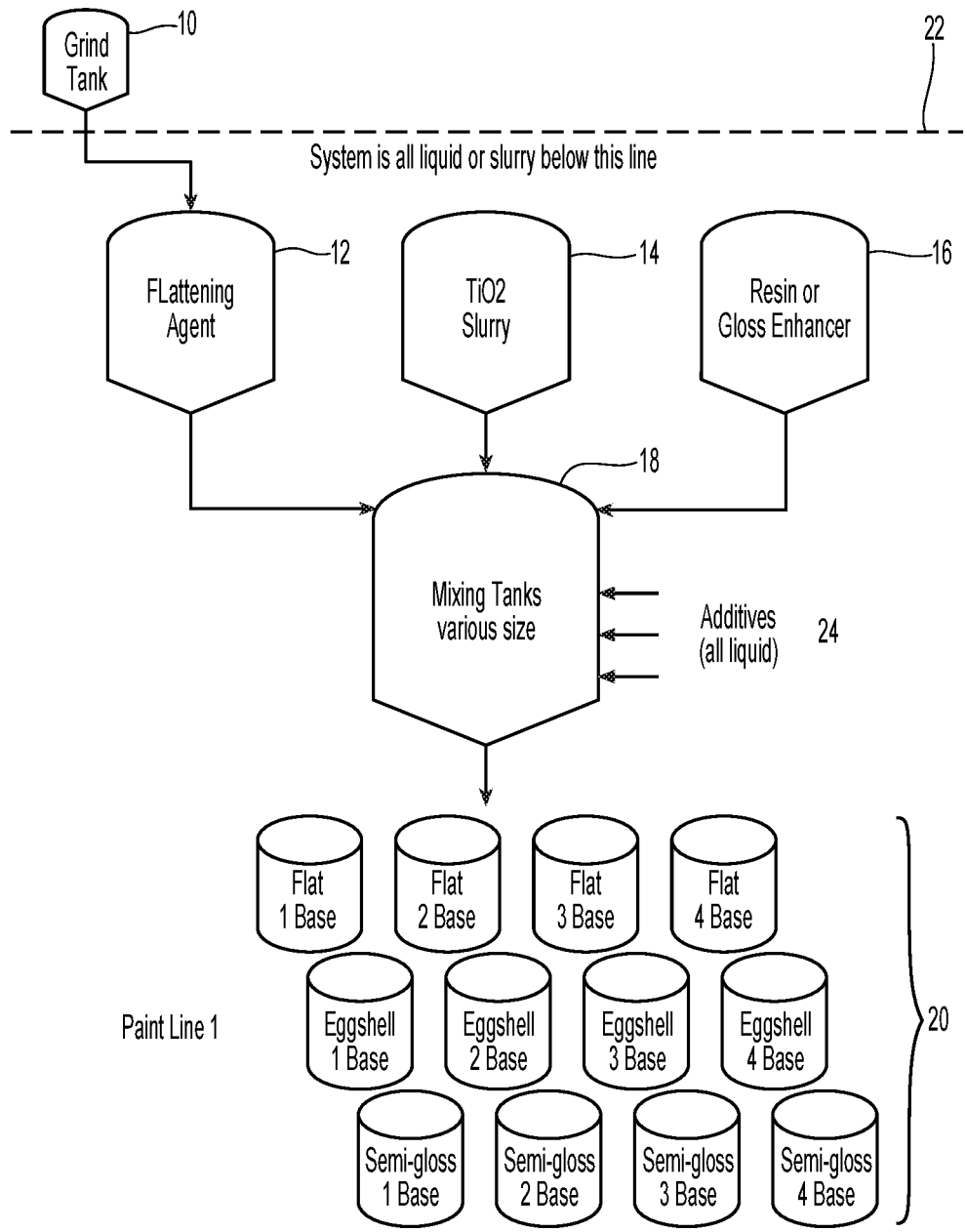
FIG. 1 is a flow diagram illustrating the inventive manufacturing technique.

The inventors of the present invention have discovered an inventive method of manufacturing paints efficiently, and an inventive way to standardize the extender pigments used in a number of paint or stain lines including all the finishes (flat, matte, eggshell, satin, semigloss) and tint bases in each paint or stain line. 1-base or white base has the highest amount of opacifying pigment; 2-base or pastel base has less opacifying pigment; 3-base or mid-tone has even less; and 4-base or deep tone may have no opacifying pigment. For example, as disclosed in commonly owned international publication No. WO 2017/192982, a matte finish scuff resistant paints have 270, 109, 34 and 0 pounds of $TiO_2$ per 100 gallons in its 1-base to 4-base, respectively. An eggshell finish scuff resistant paints have 280, 115, 36.5 and 0 pounds of $TiO_2$ per 100 gallons in its 1-base to 4-base, respectively. A satin finish scuff resistant paints have 260, 114, 35 and 0 pounds of $TiO_2$ per 100 gallons in its 1-base to 4-base, respectively. WO 2017/192982 is incorporated herein by reference in its entirety. For 4-base tintable paints, the amount of opacifying pigment grind could be zero.

Each paint or stain line typically has a unique commercial name, such as, Regal™, Ben™, Aura™, Natura™, Arborcoat™, Scuff-X™, etc. for all of the paints in that line. The paints made in accordance to the present invention have similar paint film properties and performances, such as gloss, sheen, contrast ratio and scrubability, as the paints manufactured by conventional methods.

The inventors have developed a universal or near-universal extender grind (hereinafter universal extender grind) that contains a manageable number of extenders that have been shown to perform the multiple extenders' functions in many paint compositions. The inventive universal extender grind does not need to contain all of the extender pigments used in all of the paint formulations. The combination of the selected extender pigments is designed to replace all individual extenders used in the many individual paint formulations.

The inventive universal extender grind is one of three major components that are used to manufacture paints in accordance to the present invention. The universal extender grind is preferably produced in a continuous process and then transferred to a dedicated storage tank. The universal extender grind can be blended with an opacifying ($TiO_2$) slurry or grind and an aqueous film-forming latex/resin to manufacture paints having different finishes and tint bases on demand. The amount of universal extender grind added to the paint compositions depends on the intended gloss and sheen, as well as the intended tintable or tint base. For example, more extender grind is added for flatter finishes and less is added for glossier finishes. Little or no opacifying pigment or grind for example is used with deep tint 4-base and highest amount of opacifying pigment is used for pastel 1-base.

The $TiO_2$ or opacifying grind would be formulated to match the present amount of opacifying pigments used in the existing paint lines, so that the color prescriptions would remain unchanged, as discussed in the commonly owned '722 patent. The film-forming latex/resin aqueous compositions would also remain the same for the existing paint lines.

Figure 2:
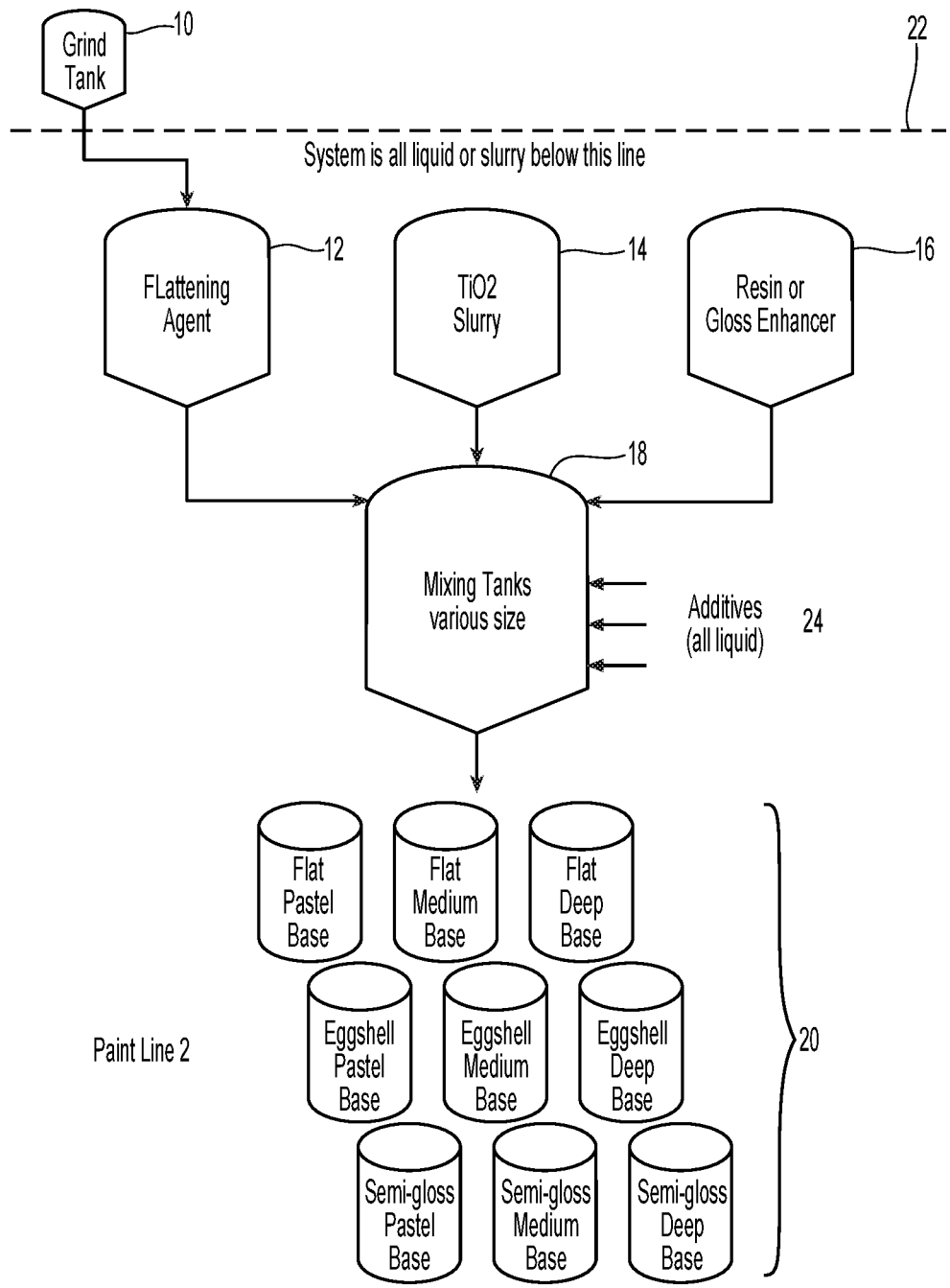
FIG. 2 is a flow diagram illustrating another embodiment of the present invention.

As best shown in FIGS. 1 and 2, the selected extenders are ground together with water, surfactant(s), dispersant(s) and optional biocide and mildewcide, discussed below, in a grind tank 10. The extender grind is transported to extender tank 12 for storage. An opacifying grind or slurry, preferably containing an opacifying pigment such as $TiO_2$, water, surfactant(s), dispersant(s), and optional biocide and mildewcide, is stored in opacifying tank 14. Preferably, the opacifying grind contains no extender pigment or substantially no extender pigment, and the extender grind contains substantially no opacifying pigment or no $TiO_2$. Preferably, the opacifying pigment is provided in an aqueous slurry and no grinding at the factory is necessary. Alternatively, a second grind tank 10 is provided to grind dry opacifying or $TiO_2$ pigments. A resin tank 16 stores the film-forming latex resin, water, surfactant(s), dispersant(s), and optional biocide and mildewcide. All three components, extender grind, opacifying grind and film-forming latex resin are mixed at preferred ratios, discussed below, in mixing tank 18. Additives, such as rheological modifier(s), defoamer(s), biocide/mildewcide, neutralizer and other paint additives can be added to mixing tank 18, as shown at reference number 24. Additionally, a second or third film-forming or non-film-forming resin that is required by particular paint formulations, such as polyurethane or silicone, can be added to mixing tank 18 along with any other additives. Thereafter, the paint compositions can be transported into paint cans 20 according to their finish and tint base for a paint line.

Another advantage of the present invention is that except for grind tank 10, as shown in FIGS. 1 and 2, all paint components below line 22 are liquid or slurry components, which can flow by gravity feed or by pumps. Opacifying pigments can be purchased in slurry form to obviate the need to grind these pigments into the opacifying grind. The process of grinding the opacifying pigments can take 4-5 hours for a 10,000-gallon batch and the elimination of this grinding step provides significant savings of time and energy, e.g., electrical power. The process of mixing liquids or slurries from tanks 12, 14 and 16 in tank 18 can be completed in less than 1 hour, thereby resulting in significant savings. The blending or admixing of all liquids or slurries in mixing tank 18 at the paint factory is not heretofore known in the art and represents an improvement to the state of the art of paint manufacturing.

In one example, a paint factory produces 3 lines of paints, which have an economical paint line of 3 finishes and 3 tint bases, a contractor paint line of 5 finishes and 4 tint bases and a high-end paint line of 5 finishes and 4 tint bases for a total of 52 paint formulations of different grind compositions and letdowns. The time required for 52 separate grind compositions would be about 260 hours or 32½ days. Under the inventive method of manufacturing, which requires 1 opacifying grind and 1 extender grind, it would take about 23 hours to make sufficient volume of grinds for all 52 paint compositions. It would require one resin tank 16 for acrylic resin and one resin tank 16 for vinyl-acrylic resin, which are the two most commonly used film-forming resins. These resins can be used singly or in combination to produce the desired paints. Other specialty resins, such as silicone or polyurethane can be stored in smaller tanks or in tanks sized and dimensioned to store additives.

The universal extender grind can also be manufactured using a continuous process instead of a batch system using a 10,000-gallon tank. The cost savings in this example of three paint lines can be quantified as follows. If the annual volume of the pigments, including opacifying and extender pigments, is about 18 million gallons, and the volume of a single batch is 10,000 gallons, for the opacifying grind and the extender grind, then the annual savings in electricity alone would be about $400,000 and a significant reduction is labor, complexity and carbon footprint.

Advantageously, another environmental benefit is that less water is needed to wash the tanks and equipment when a different grind is produced. Due to the chemicals contained in the grinds, washed water becomes waste water that must be treated or stored for reuse the next time the same grind is ran. With the single opacifying slurry/grind and universal extender grind being used, the need to wash the tanks and equipment after each batch is significantly reduced or potentially eliminated. In the example above, 18 million gallons annual production using 10,000-gallon tanks would require about 1,800 washes that would be saved by the present invention.

Another advantage of the present invention is that the number of extender pigments used universal extender grind used for the various paint lines can be reduced to as low as three extender pigments. Additional extender pigment(s) can also be included in the universal extender grind. The present inventors have discovered that a combination of at least calcium carbonate, aluminum silicate and diatomaceous earth (DE) can be formulated to be the universal extender grind and be used across an entire paint line, and advantageously across several paint lines.

Calcium carbonate ($CaCO_3$) is relatively easier to disperse and need little to no dispersants. Hence, calcium carbonate is a good filler and has some hiding power and is used to replace $TiO_2$ and to improve the critical pigment volume (CPV). Small particle size calcium carbonate improves dispersion and can be used in the grinding step or used as anti-flocculant to improve hiding, even though smaller particle size calcium carbonate has less opacity than coarser calcium carbonate in oil. See Siesholtz et al, supra. However, calcium carbonate does not contribute significantly to paint film integrity and is susceptible to acid degradation. Hence, the amount of calcium carbonate used is specified below. A synthetic form of calcium carbonate, known as precipitated calcium carbonate is also used. Calcium carbonate generally has a plate-like shape and about 12 μm particle size or less.

Aluminum silicate ($Al_2O_3.SiO_2$) or kaolin or China clay, preferably calcined aluminum silicate, is used to extend the opacifying pigment. Aluminum silicate particles have good CIE, GE or TAPPI brightness, whiteness and hiding or tint strength. Aluminum silicate particles generally have smaller particle sizes, e.g., from about 1 μm to about 5 μm.

Diatomaceous earth (DE) is an amorphous silica and while DE is chemically silica, DE is formed from the skeletal remains of organic organism known as diatoms and has multiple holes and channels in its structure. DE therefore has different properties than mined or synthetic silica. Silica ($SiO_2$) is chemically inert and therefore more acid-resistance. Silica also contributes to tougher, more durable paint film that has higher scrubability. Silica can also improve adhesion of the paint to the underlying substrate. Due to its organic origin, DE has irregular shapes. As used herein, DE is different than silica that is mined, synthetic or produced from sources other than skeletal remains of organic organisms.

The present inventors have also discovered that to replace individual extender pigments in all different formulations the universal extender grind should include diatomaceous earth and the DE should be present at a lower limit of more than about 6.5% of the total weight of the universal extender grind (wet) or about 13% of the total extender weight (dry). Preferably the DE should be present at more than about 7% of the total weight of the universal extender grind or about 14% of the total extender weight. The DE can present to an upper limit of about 15% or higher of the total weight of the universal extender grind or about 30% or higher of the total extender weight. Without the lower limit or minimum DE in the universal extender grind, all the finishes or glosses (flat, matte, eggshell, satin, semigloss) and the tintable basis (1-base to 4-base) within a paint line would not be achieved. While other factors in the universal extender grind may also vary as discussed below, the minimum DE amount is necessary for the universal extender grind.

The range of DE can be anywhere between the lower limit and the upper limit stated above in increments of about 0.5%. For example, the range of DE can be between about 6.5% wet (13% dry) and 15% wet (30% dry), or between 8.5% wet (17% dry) and 10.0% wet (20% dry), or between 8% wet (16% dry) and 8.5% wet (17% dry), or between 11% wet (22% dry) and 12.5% wet (25% dry), etc.

An exemplary properties of common extender pigments as compared to $TiO_2$ opacifying pigment is shown below.

TABLE 1

| Pigment | Index Refraction[1] | Approximate Size (μm) | Shape |
|---|---|---|---|
| $TiO_2$ | 2.61 | 0.2-0.5 | Block |
| ZnO | 2.034 | | |
| $CaCO_3$ - ground | 1.65 | 0.6-20.0 | Block |
| $CaCO_3$ - precipitate | 1.65 | 0.1-2.0 | Block, aggregate |
| $Al_2O_3 \cdot SiO_2$ - ground | 1.57 | 0.1-5 | Plate |
| $Al_2O_3 \cdot SiO_2$ - calcined | 1.54 | 0.8-2.0 | Plate |
| DE (amorphous silica) | 1.46 | 10-200 | Irregular |
| $H_2Mg_3(SiO_3)_4$ magnesium silicate (talc) | 1.58 | 1.0-10.0 | Plate and fiber |
| Aluminum potassium silicates (mica) | 1.6 | 8-50 | Flake, plate |
| Nepheline syenite | 1.52 | 2.4-13.6 | |

[1]See P. M. Alua, "Opacity Optimization of Waterborne Paints," institute Superior Tecnico, Universida Tecnica de Lisboa, July 2012, available at hhtps://fenix.tecnico.ulisboa.pt/downloadFile/395144321407/resumo.pdf, with is incorporated herein by reference in its entirety, except for nepheline syenite and zinc oxide.

As used herein, opacifying pigments are those having an index of refraction higher than about 1.8 or about 2.0 and extender pigments are those having an index of refraction lower than about 1.8 or about 2.0.

A non-limiting Example 1 of the inventive universal extender grind is shown below. The savings reported above were associated with the universal extender grind shown in this example.

TABLE 2

EXAMPLE 1

| Components | Wt. (lbs.) | PS (μm) † |
|---|---|---|
| defoamer | 2.5 | |
| mildewcide (Zn pyrithione + ZnO) | 2.3 | |
| bactericide (BIT) | 4.4 | |
| calcium carbonate ($CaCO_3$) -- dry§ | 130.6 | 12 |
| Calcined Aluminum Silicate‡: | 229 | 1.4 |
| silica ($SiO_2$) 52%; alumina ($Al_2O_3$) 43% -- dry | 98.5 | 1.3 |
| diatomaceous earth (DE) - dry | 82.25 | 12 |
| HMHEC associated thickener -- dry | 6 | |
| water | 547.831 | |
| anionic fluoro surfactant | 1 | |
| hydrophobic copolymer pigment dispersant | 26.4 | |
| nonionic surfactant | 12 | |
| Total weight: | 1142.781 | |
| total weight of dry extenders | 540.35 | |
| wt. % extenders | 47.28% | |

(HMHEC is hydrophobically modified hydroxyethyicelluiose.)
‡different grade of same product, which have slightly different PS and impurities (5%).
† Particle size (PS) is the mean particle size reported by the manufacturers.
§including impurities (3%)

TABLE 3

| Individual extenders in extender grind in Example 1 | | Ext Wt. % | Total Wt. % | PS(μm) |
|---|---|---|---|---|
| $CaO_3$ | 126.68 | 23.46 | 11.09 | 12 |
| $Al_2O_3 \cdot SiO_2$ | 311.125 | 57.58 | 27.23 | 1.4 |
| DE ($SiO2$) | 82.25 | 15.22 | 7.20 | 12 |
| Sub-total: primary extenders | 520.055 | 96.24% | 45.51% | |
| Other extenders/components | 20.293 | 3.76 | | |
| Sub-total: dry components | 540.35 | 100% | 47.28% | |
| Total: dry + wet components | 1142.781 | | | |

As shown above, some of the commercially available extenders contain multiple individual extenders and in various grades. The extenders may include other components such as small amounts of $TiO_2$, $K_2O$, $Na_2O$, other extenders and impurities. Preferably, $TiO_2$ is present at less than about 10 wt. %, more preferably less than about 9 wt. %, more preferably less than about 8 wt. % or about 7 wt. %, and most preferably at the impurity level or substantially none. Other known extenders may be added.

Also, preferably the universal extender grind contains substantially no film-forming resin or no resin. Although, a small amount of resin can be added for any purpose, e.g., as polymeric dispersant or surfactants. Preferably, the universal extender grind contains less than about 5 wt. % resin, preferably less than about 3 wt. %, preferably less than about 1 wt. %, more preferably less than about 0.5 wt. % or less than about 0.25 wt. % of resin.

The present inventors have conducted in-depth experimentation to ensure that the paints manufactured in accordance to the present invention perform as well as made in the traditional or conventional method and reduce costs. The results for 1-base paints are shown in Tables 4-6 below. The gloss and sheen values have gloss units (GU) and measured by a gloss meter, and higher values indicate shinier paint films and more film-forming resin in the formulations. ASTM method D 523 provides the procedures for performing the gloss or sheen test. The contrast ratio (C/R) is dimensionless and indicates the hiding properties of a paint film. Contrast ratio (C/R) is a measurement of the hiding power (or opacity) of a paint. C/R is measured in accordance with ASTM D2085-88 "Standard Test Method for Hiding Power of Paints by Reflectometry." Scrubability is the number of times that an abrasive surface rubs against the paint film before the paint film fails. Scrubability test is conducted pursuant to ASTM D2486 Method B.

TABLE 4

Economical Paint Line 1-Base

| | Saving per gallon | Gloss | Sheen | C/R | Scrubs |
|---|---|---|---|---|---|
| Traditional Flat | | 2.1 | 3.6 | 96.17 | 170 |
| Inventive Flat | ($0.25) | 2.2 | 3.1 | 96.37 | 185 |
| Traditional Eggshell | | 12.1 | 21.8 | 93.54 | 810 |
| Inventive Eggshell | $0.425 | 7.2 | 17.8 | 94.60 | 1018 |
| Traditional Gloss | | 45.7 | 74.1 | 94.00 | 675 |
| Inventive Gloss | $0.456 | 48 | 80.2 | 94.21 | 900 |

Gloss is typically measured at 60° from vertical and sheen is typically measured at 85° from vertical. Both values show how a painted surface is viewed at a more direct angle and a more glancing angle.

TABLE 5

Contractor Grade Paint Line 1-Base

| | Saving per gallon | Gloss | Sheen | C/R | Scrubs |
|---|---|---|---|---|---|
| Traditional Flat | | 2.3 | 5.7 | 95.30 | 235 |
| Inventive Flat | $0.015 | 2.2 | 3.3 | 95.04 | 305 |
| Traditional Eggshell | | 4.6 | 21.6 | 95.17 | 550 |
| Inventive Eggshell | $0.498 | 5.6 | 18.4 | 97.27 | 868 |
| Traditional Semi-gloss | | 59.7 | 91.1 | 96.31 | 1104 |
| Inventive Semi-gloss | $0.520 | 45.2 | 77.2 | 95.71 | 1460 |

TABLE 6

Premium Paint Line 1-Base

| Premium Paint | Saving per gallon | Gloss | Sheen | C/R | Scrubs |
|---|---|---|---|---|---|
| Traditional Flat | | 2.2 | 3.6 | 93.97 | 420 |
| Inventive Flat | $0.048 | 2.5 | 4.1 | 94.27 | 490 |
| Traditional Eggshell | | 6.8 | 17.1 | 95.78 | 980 |
| Inventive Eggshell | $0.078 | 8.7 | 19.3 | 95.81 | 1080 |
| Traditional Semi-gloss | | 64.8 | 92.7 | 95.40 | 1010 |
| Inventive Semi-gloss | $0.206 | 55 | 85.6 | 96.57 | 1200 | paint lines in 1-base in the three most popular finishes. The savings are higher for the glossier finishes and less for flatter finishes. The savings calculated herein are based only on savings from raw materials. The paints manufactured pursuant to the present invention have comparable gloss and sheen. The paints manufactured pursuant to the present invention also have comparable hiding power, as illustrated by the contrast ratios. The amount of opacifying pigment ($TiO_2$) remains substantially the same as in the traditional manufacturing method.

Surprisingly, all the paints manufactured by the inventive method have similar or improved scrubability. This means that the paint films made from these inventive paints have better mechanical property, i.e., tougher films, than the traditional paints. These are benefits derived from the inventive method of manufacturing paints in addition to saving manufacturing costs.

The present inventors also conducted experiments with Example 1 of the inventive universal extender grind for the higher tint bases. These experiments were conducted on the same premium paint line, as shown in Table 6 above. The 2-base, 3-base and 4-base paints were made by following each formula's opacifying grind and letdown leading to similar paints for each base. The results are shown in Table 7, below.

TABLE 7

Premium Paint Line 2-Base/3-Base/4-Base

| Premium Paints | Saving per gallon | Gloss | Sheen | C/R | Scrubs |
|---|---|---|---|---|---|
| Traditional Flat 2-Base | | 2.3 | 0.9 | 91.70 | 280/300 |
| Inventive Flat 2-Base | $0.268 | 2.2 | 1.3 | 95.35 | 270/300 |
| Traditional Flat 3-Base | | 3.0 | 1.7 | 75.92 | 360/390 |
| Inventive Flat 3-Base | $0.252 | 2.1 | 1.1 | 83.81 | 360/395 |
| Traditional Flat 4-Base | | 3.6 | 2.0 | 12.05 | 900/950 |
| Inventive Flat 4-Base | $0.177 | 3.9 | 2.8 | 29.87 | 900/950 |

The 2-base, 3-base and 4-base paints were made using different amounts of the universal grind shown in Example 1. These experimental paints have similar gloss and sheen as the traditional paints. Hiding power, as illustrated by the contrast ratio (C/R), is higher in these higher tintable bases, especially in 3-base and 4-base. The amount of opacifying pigment in the opacifying grind or the amount of aluminum silicate could be reduced to increase cost savings.

Two additional universal grinds were prepared and shown below in Table 8 as Example 2 and 3. Example 2 does not contain the calcined aluminum silicate (52% $SiO_2$.43% $Al_2O_3$) grade used in Example 1 and Example 3 uses a smaller amount of this calcine aluminum silicate grade. Instead, a nepheline syenite extender is used in Examples 2 and 3. Nepheline syenite has a different ratio of silica to alumina, and also contains small amounts of potassium oxide and sodium oxide, as shown below. Examples 2 and 3 also use calcium carbonate of smaller mean diameter. Examples 2 and 3 should reduce hiding or whiteness in higher tintable base paints. For comparison purpose, Example 1 is also included.

TABLE 8

| Components | Example 1 Wt. (lbs.) | Example 2 Wt. (lbs.) | Example 3 Wt. (lbs.) | PS (μm) † |
|---|---|---|---|---|
| Defoamer | 2.5 | 2.5 | 2.5 | |
| mildewcide (Zn pyrithione + ZnO) | 2.3 | 2.3 | 2.3 | |
| bactericide (BIT) | 4.4 | 4.4 | 4.4 | |
| calcium carbonate ($CaCO_3$) -- dry | 130.6 | | | 12.0 |
| | | 160 | 160 | 6.0 |
| | | 73 | 73 | 3.2 |
| Calcined Aluminum Silicate‡: $SiO_2$ (52%), $Al_2O_3$ (43%) -- dry | 229 | | | 1.4 |
| | 98.5 | | 98 | 1.3 |
| Nepheline syenite $SiO_2$ (60.2%), $Al_2O_3$ (23.6%), $Na_2O$ (10.4%), $K_2O$ (4.85%) -- dry | | 250 | 133.7 | 6.8 |
| ‡ Free crystalline silica deficient. | | | | |

TABLE 8-continued

| Components | Example 1 Wt. (lbs.) | Example 2 Wt. (lbs.) | Example 3 Wt. (lbs.) | PS (μm) † |
|---|---|---|---|---|
| diatomaceous earth (DE) - dry | 82.25 | 110 | 110 | 12.0 |
| HMHEC associated thickener -- dry | 6 | 6 | 6 | |
| water | 547.831 | 550.4 | 550.4 | |
| anionic fluoro surfactant | 1 | 1 | 1 | |
| hydrophobic copolymer pigment dispersant | 26.4 | 26.4 | 26.4 | |
| nonionic surfactant | 12 | 12 | 12 | |
| Total weight: | 1142.781 | 1198.0 | 1179.7 | |
| total weight of dry extenders | 540.35 | 593.0 | 574.7 | |
| wt. % extenders | 47.28% | 49.5% | 48.72% | |

The aluminum silicates are grouped together notwithstanding the differences in percentage of alumna and silica.

TABLE 9

| Individual extenders in extender grind in Example 2 | | Ext Wt. % | Total Wt. % | PS(μm) |
|---|---|---|---|---|
| $CaCO_3$ | 226.01 | 38.11 | 18.87 | 3.6 |
| $Al_2O_3 \cdot SiO_2$ | 209.50 | 35.33 | 17.49 | 6.8 |
| $DE(SiO_2)$ | 110 | 18.55 | 9.18 | 12 |
| Sub-total: primary extenders | 545.51 | 91.98% | | |
| $Na_2O$ | 26 | 4.38 | 2.17 | |
| $K_2O$ | 12.125 | 2.04 | 1.01 | |
| Other extenders/components | 9.365 | 1.58 | | |
| Sub-total: dry components | 593 | 100% | | |
| Total: dry + wet components | 1198 | | | |

TABLE 10

| Individual extenders in extender grind in Example 3 | | Ext Wt. % | Total Wt. % | PS(μm) |
|---|---|---|---|---|
| $CaCO_3$ | 226.01 | 39.33 | 19.16 | 6.3 |
| $Al_2O_3 \cdot SiO_2$ | 207.1 | 36.04 | 17.56 | 1.4, 6.8 |
| $DE (SiO_2)$ | 110 | 19.14 | 9.32 | 12 |
| Sub-total: primary extenders | 543.11 | 94.5% | | |
| $Na_2O$ | 13.91 | 2.42 | 1.18 | |
| $K_2O$ | 6.48 | 1.13 | 0.55 | |
| Other extenders/components | 11.2 | 1.95 | | |
| Sub-total: dry components | 574.7 | 100% | | |
| Total: dry + wet components | 1179.7 | | | |

The universal extender grinds shown in Examples 1-3 were tested in a lower premium flat paint in higher tinted bases. This lower premium paint line is similar in quality to the premium paint line discussed above. The results show that Examples 2 and 3 were able to reduce the hiding (C/R) of these paints to the level of the traditional paints, preferably in the 4-base paint.

TABLE 11

Lower Premium Flat 2-Base

| Universal Grind | KU | ICI | Cost Saving per Gallon | Gloss | Sheen (1.0-2.5) | Scrubs | C/R |
|---|---|---|---|---|---|---|---|
| / | | | | 2.4 | 0.9 | 330/470 460/590 | 91.70 |
| Example 1 | 95.2 | 0.94 | ($0.268) | 2.2 | 1.3 | 440/495 | 95.35 |
| Example 2 | 87.2 | 0.90 | ($0.062) | 2.6 | 1.4 | 390/490 | 93.03 |
| Example 3 | 87.2 | 0.84 | ($0.117) | 2.4 | 1.9 | 365/510 | 93.77 |

TABLE 12

Lower Premium Flat 4-Base

| Universal Grind | KU | ICI | Cost Saving per Gallon | Gloss | Sheen (2.0-3.5) | Scrubs | C/R |
|---|---|---|---|---|---|---|---|
| / | | | | 3.6 | 2 | 900/950 920/970 | 12.05 |
| Example 1 | 96.2 | 0.78 | ($0.177) | 3.9 | 2.8 | 900/950 | 29.87 |
| Example 2 | 89.9 | 0.76 | $0.077 | 4.8 | 3.6 | 920/960 | 8.64 |
| Example 3 | 89.9 | 0.80 | $0.027 | 4.4 | 3.3 | 910/970 | 14.32 |

The same three versions or examples of the universal extender grind were also tested in the 1-base for the same lower premium paint line, which has the highest amount of opacifying pigment. The results are similar to those for the other 1-base paints reported above. The hiding is similar for all three versions.

TABLE 13

Lower Premium Flat 1-Base

| Universal Grind | KU | ICI | Cost | Gloss | Sheen (1.0-4.0) | Scrubs | C/R |
|---|---|---|---|---|---|---|---|
| / | | | | 2.2 | 3.6 | 420 | 93.97 |
| Example 1 | 101.0 | 1.03 | $0.048 | 2.5 | 4.1 | 490 | 94.27 |
| Example 2 | 97.0 | 1.09 | $0.200 | 3.3 | 3.8 | | 93.17 |
| Example 3 | 97.5 | 0.99 | $0.160 | 3.0 | 3.8 | | 93.50 |

The three versions or examples of the universal extender grind were also tested in the 1-base for the same economical paint line discussed above. Example 1 of the universal extender grind has similar results, i.e., hiding and scrubs, as discussed above. Examples 2 and 3, which have lower whiteness, have lower hiding. The lower hiding is expected, since the economical paint line contains less opacifying pigments than the higher grade or quality paint lines.

TABLE 14

Economical Paint Line 1-Base

| Universal Grind | KU | ICI | Cost | Gloss | Sheen (2.5-4.5) | Scrubs | C/R |
|---|---|---|---|---|---|---|---|
| | 93.2 | 1.90 | 4.468 | 2.2 | 3.6 | 170 | 95.85-96.23 |
| Example 1 | 98.1 | 1.87 | ($0.250) | 2.2 | 3.1 | 185 | 96.37 |
| Example 1 | 91.8 | 1.26 | ($0.115) | 2.2 | 2.7 | 150 | 96.08 |
| Example 2 | 89.2 | 1.21 | $0.029 | 2.2 | 1.5 | | 89.59 |
| Example 3 | 91.4 | 1.19 | $0.009 | 2.2 | 1.7 | | 91.32 |

The universal extender grinds, as illustrated in Examples 1-3, have the following principal components, expressed as a weight percentage of the total universal extender grind including water.

TABLE 15

|  | Example 1 | Example 2 | Example 3 |
|---|---|---|---|
| $CaCO_3$ | 11.09% | 18.87% | 19.16% |
| $Al_2O_3 \cdot SiO_2$ | 27.23% | 17.49% | 17.56% |
| DE ($SiO_2$) | 7.20% | 9.18% | 9.32% |

The preferred ranges for DE for the universal extender grind are discussed above. Aluminum silicate preferably ranges from about 15 wt. % to about 30 wt. % of the grind (wet). A lower amount from about 15 wt. % to about 20 wt. %, preferably from about 16 wt. % to about 19 wt. % or preferably from about 17 wt. % to about 18 wt. % of aluminum silicate is preferred for 3-base and 4-base tintable paints, as well as for 2-base, and a higher amount from about 25 wt. % to about 30 wt. %, preferably from about 26 wt. % to about 29 wt. % or preferably from about 27 wt. % to about 28 wt. % of aluminum silicate is preferred for 1-base tintable paints.

Calcium carbonate can make up the remaining amount of extender or most of the remaining extender. Preferably, calcium carbonate comprises from about 8 wt. % to about 30 wt. % of the grind (wet), preferably from about 9 wt. % to about 25 wt. % or from about 10 wt. % to about 20 wt. %.

In one preferred embodiment, the universal extender grind may comprise the lower amount of 15 wt. % to 20 wt. % of aluminum silicate (and its subranges) more suitable for 3-base and 4-base tintable paints, and an extra amount of aluminum silicate in slurry or grind form is added to mixing tank 18 as an additive 24, as shown in FIGS. 1 and 2, to bring the level of aluminum silicate to that of the higher amount of 25 wt. % to 30 wt. % (and its subranges) more suitable for 1-base tintable paint. In another embodiment two universal extender grinds, i.e., both the lower and higher amounts of aluminum silicate in separate tanks, are used to manufacture tintable paints in all bases and finishes.

An exemplary opacifying pigment grind according to the present invention preferably has an insignificant amount of extender, e.g., less than about 10 dry wt. %, more preferably substantially no extender, e.g., less than about 5 dry wt. %, and more preferably no extender or only trace amounts thereof, e.g., less than about 1 dry wt. %. The weight of the extenders in the traditional pigment grinds can be replaced by opacifying pigment or $TiO_2$ or water. In a preferred embodiment, the opacifying pigment grind is a commercially available pigment slurry with the $TiO_2$ suspended in water and with dispersants and/or surfactants to prevent re-agglomeration of the pigments. Also, preferably the pigment grind contains substantially no film forming resin or no resin. Although, a small amount of resin can be added for any purpose, e.g., as polymeric dispersant or surfactants. As discussed above, no opacifying pigment grind (or only a small amount) is preferably used to make 4-base tintable paints. Hence, broadly speaking the opacifying grind is optional for the present invention.

A representative opacifying grind is shown below.

| Propylene Glycol | 10.8 |
| Water | 104.5 |
| Biocide 1 | 1.5 |

-continued

| Antimicrobial 1 | 1.9 |
| Dispersant/Surfactant 1 | 7.7 |
| Titanium dioxide pigment | 346.5 |
| Defoamer 1 | 0.7 |
| Extender | None/substantially none |
| Resin | None/substantially none |

The aqueous film-forming resin component, as stated above, can be the traditional resin latexes including but not limited to acrylic, vinyl-acrylic or vinyl. Exemplary, non-limiting aqueous film-forming resin or latex compositions are discussed in commonly owned U.S. Pat. Nos. 7,642,314; 7,589,158; 7,754,801 C1; U.S. Pat. Nos. 7,547,740; 7,435,777; 8,092,909; 8,530,591; 8,815,981; 8,507,579; 9,505,922; 9,499,680; 8,8895,658; 9,115,265; 9,588,800; 9,453,133; and 9,934,460, among others, and published patent application Nos. 2008/0058473. The references are incorporated by reference herein in their entireties. Generally, the aqueous film-forming resin component comprises from about 40 wt. % to about 60 wt. %, preferably from about 45 wt. % to about 55 wt. %

Exemplary, non-limiting examples of amount of the three main components, i.e., the opacifying pigment grind, the universal extender grind and the resin, to produce the inventive plurality of paint compositions are shown below

TABLE 16

Exemplary Components for Premium Paint Line

|  |  | Flat | Eggshell (lbs./100 gallons) | Semi-gloss |
|---|---|---|---|---|
| Pastel Base (1 Base) | Universal Grind | 330 | 160 | 15 |
|  | $TiO_2$ Grind | 309 | 353 | 400 |
|  | Resin | 322 | 408 | 469 |
| Medium Base (2 Base) | Universal Grind | 450 | 167 | 15 |
|  | $TiO_2$ Grind | 158 | 151 | 148 |
|  | Resin | 256 | 426 | 475 |
| Medium Base (3 Base) | Universal Grind | 450 | 174 | 16 |
|  | $TiO_2$ Grind | 42 | 47 | 59 |
|  | Resin | 290 | 443 | 490 |
| Deep Base (4 Base) | Universal Grind | 418 | 201 | 18 |
|  | $TiO_2$ slurry | 0 | 0 | 0 |
|  | Resin | 465 | 511 | 530 |

Water and other additives make up the rest of the paint compositions.

Definitions

A paint line is defined herein and in the appended claims as a collection of paint compositions that share the same tradename, and most or preferably all of the paints have the same type of film-forming resin binder including the same monomers, e.g., acrylic, vinyl-acrylic, etc., and whether the film-forming resin binder is cross-linkable and whether the film-forming resin binder contains cross-linking agents. The paint compositions in the paint line may have different tintable bases, e.g., 1-base, 2-base, 3-base and 4-base, with different amount of opacifying pigment/$TiO_2$ to vary the tint base and different amounts of flatteners in the extender pigment package to vary the gloss/sheen.

A grind is an aqueous composition containing either one or more opacifying pigments or one or more extender pigments, made inside the paint factory. A slurry is an aqueous composition of opacifying pigment or $TiO_2$ that is purchased and transported to the paint factory.

Opacifying pigments are those having an index of refraction higher than about 1.8 or about 2.0 and extender pigments are those having an index of refraction lower than about 2.0 or about 1.8.

The gloss or the gloss finish of a dried paint surface indicates the level of shininess or glass-likeness of the surface. The level of gloss ranges from flat/matte to high gloss. The gloss of a surface can be described as the reflection of light from the surface that is independent of color. To measure gloss, a single beam of light is deflected off the surface at a particular angle into a receptor, as shown below and discussed in http://www.paintinfo.com/mpi/approved/sheen.shtml, which is incorporated herein by reference in its entirety.

The receptor gauges the intensity of that light in gloss units. The equipment is standardized with specially produced, polished, glass or ceramic tiles. ASTM method D 523 provides the procedures for performing this gloss test.

ASTM method D 523 uses 60° angle for comparing surface glosses and to determine whether other angles such as 20° and 85° are warranted. The 20° angle is used when the surface sample has a 60° gloss value greater than 70 gloss units, and the 85° is used if the 60° gloss value is less than 30 gloss units. Referring to the figure above, the angle is measured from a vertical axis, e.g., a 60° angle is measured from the vertical line or the 0° line, and the 60° angle is 30° above the surface being tested.

Commonly, the term sheen is used to describe the low angle gloss, e.g., 85° from vertical or 5° above the surface to be measured. The 85° angle is preferred in measuring low gloss coatings and is generally a more accurate indicator of the transition between flat and eggshell. Steep angles, such as 20°, are more often used with a high gloss surface such as automotive coatings.

The Master Paint Institute (MPI) categorizes the gloss finishes of paints as follows:

TABLE 17

The Reflectivity of Paints with Different Gloss at Different Angles

| Type of Paint Finish | 20° Gloss | 60° Gloss | 85° Gloss |
| --- | --- | --- | --- |
| High Gloss | 20-90 | 70-85+ | — |
| Semi-Gloss | 5-45 | 35-70 | — |
| Satin | — | 20-35 | min. 35 |
| Eggshell | | 10-25 | 10-35 |
| Flat/Matte | | 0-10 | max. 35 |

Higher gloss values indicate shinier surfaces.

As discussed in http://www.paintinfo.com/mi/approved/sheen.shtml, the gloss level of a coating is affected by its surface roughness. The protrusion of pigment or extender particles through the binder layer causes diffraction of light and gives the coating a dullness. Where the pigment or extender particles are covered by the binder layer, the coating surface is smoother and light incident at an angle is readily reflected. The gloss or reflected light can influence the visual color of a surface when viewed from various angles. This can be seen when coating surfaces have been tinted to the same color but with different finishes or gloss levels are applied side-by-side on the same substrate. Viewing from a position directly above and perpendicular to the coating surfaces, with the light directly behind, will show the closest color. Moving the field of view to an angle away from the perpendicular or moving the light source will show a color difference caused by the differences in gloss.

Contrast ratio is measured on a 3-mil draw down dried overnight with a spectrophotometer. Contrast ratio (C/R) is a measurement of the hiding power (or opacity) of a paint. C/R is measured in accordance with ASTM D2085-88 "Standard Test Method for Hiding Power of Paints by Reflectometry." When two coats with the same C/R are applied, a C/R of at least 95% of each coat is considered acceptable. The overall C/R of at least 99%, and more preferably 99.5%, is considered acceptable for two or more coats of dry film.

Scrubability test shows the number of scrub cycles before failure and the test is conducted pursuant to ASTM D2486 Method B.

Pigment volume concentration is defined as $$PVC(\%) = \frac{V_{pigment} + V_{Extender}}{V_{pigment} + V_{Extender} + V_{Binder}} \times 100$$

While it is apparent that the illustrative embodiments of the invention disclosed herein fulfill the objectives stated above, it is appreciated that numerous modifications and other embodiments may be devised by those skilled in the art. Therefore, it will be understood that the appended claims are intended to cover all such modifications and embodiments, which would come within the spirit and scope of the present invention.

We claim:

1. A method for manufacturing a plurality of paint compositions comprising paints having different tintable bases and at least flat, eggshell and semi-gloss finishes, wherein the flat finish measures from 0 to 10 gloss value at 60°, the eggshell finish measures from 10 to 35 sheen value at 85° and the semi-gloss finish measures from 35 to 70 gloss value at 60°, said method comprises the steps of:
   (a) optionally selecting and transporting one of a plurality of aqueous opacifying pigment grinds into a mixing tank;
   (b) transporting an aqueous universal extender grind into the mixing tank;
   (c) selecting and transporting one of a plurality of aqueous film-forming resin solutions into the mixing tank;
   (d) adding at least one additive to the mixing tank; and
   (e) mixing all transported components in the mixing tank to manufacture said plurality of paint compositions, wherein said universal extender grind is used in manufacturing the plurality of paint compositions, and wherein said universal extender grind comprises from about 13.0 wt. % to about 30 wt. % of diatomaceous earth, from about 30 wt. % and about 60 wt. % of aluminum silicate and a third extender, wherein the wt. % values are dry wt. %.

2. The method of claim 1, wherein step (a) further comprises the step of affirmatively transporting another one of the plurality of the aqueous opacifying pigment grinds to the mixing tank.

3. The method of claim 1, wherein step (c) further comprises the step of transporting another one of the plurality of the aqueous film-forming resin solutions to the mixing tank.

4. The method of claim 1, wherein the plurality of paint compositions comprise paint compositions from a plurality of paint lines, wherein the paint compositions in a paint line have a same type of film-forming resin binder including same monomers.

5. The method of claim 1, wherein the third extender comprises a calcium carbonate extender pigment.

6. The method of claim 1, wherein said universal extender grind comprises about 30 wt. % to about 40 wt. % of aluminum silicate.

7. The method of claim 6, wherein wherein said universal extender grind comprises from about 16 wt. % to about 28 wt. % of diatomaceous earth.

8. The method of claim 1, wherein said universal extender grind comprises about 50 wt. % to about 60 wt. % of aluminum silicate.

9. A universal grind of extender pigments, which is adapted to be used to manufacture a plurality of paint compositions, comprising
  a diatomaceous earth pigment, wherein said universal extender grind comprises from about 13 wt. % to about 30 wt. % of diatomaceous earth,
  an aluminum silicate pigment, wherein said universal extender grind comprises from about 30 wt. % and about 60 wt. % of aluminum silicate, and
  a third extender pigment,
  wherein the wt. % values are dry wt. %,
  wherein various amounts of said universal grind can be admixed with an optional opacifying pigment grind and an aqueous film forming resin solution to manufacture the plurality of paint compositions to adjust the gloss or sheen of the plurality of paint compositions, and
  wherein the plurality of paint compositions comprise paints having different tintable bases and at least flat, eggshell and semi-gloss finishes, wherein the flat finish measures from 0 to 10 gloss value at 60°, the eggshell finish measures from 10 to 35 sheen value at 85° and the semi-gloss finish measures from 35 to 70 gloss value at 60°.

10. The universal grind of extender pigments of claim 9 comprising from about 14 wt. % to about 30 wt. % of diatomaceous earth.

11. The universal grind of extender pigments of claim 10 comprising from about 16 wt. % to about 28 wt. % of diatomaceous earth.

12. The universal grind of extender pigments of claim 11 comprising from about 18 wt. % to about 26 wt. % of diatomaceous earth.

13. The universal grind of extender pigments of claim 9 comprising from about 30 wt. % to about 40 wt. % of aluminum silicate.

14. The universal grind of extender pigments of claim 13 comprising from about 32 wt. % to about 38 wt. % of aluminum silicate.

15. The universal grind of extender pigments of claim 14 comprising from about 34 wt. % to about 36 wt. % of aluminum silicate.

16. The universal grind of extender pigments of claim 9 comprising from about 50 wt. % to about 60 wt. % of aluminum silicate.

17. The universal grind of extender pigments of claim 16 comprising from about 52 wt. % to about 58 wt. % of aluminum silicate.

18. The universal grind of extender pigments of claim 17 comprising from about 54 wt. % to about 56 wt. % of aluminum silicate.

19. The universal grind of extender pigments of claim 9, wherein the third extender pigment comprises from about 16 wt. % to about 60 wt. % of calcium carbonate.

20. The universal grind of extender pigments of claim 19, wherein the third extender pigment comprises from about 18 wt. % to about 50 wt. % of calcium carbonate.

21. The universal grind of extender pigments of claim 20, wherein the third extender pigment comprises from about 20 wt. % to about 40 wt. % of calcium carbonate.

22. The universal grind of extender pigments of claim 9 comprising less than about 5 wt. % of polymeric resin.

23. The universal grind of extender pigments of claim 1, wherein the plurality of paint compositions comprises interior and exterior paints.

24. A method for making a universal grind of extender pigments comprising a plurality of extender pigments, wherein the extender pigments are selected for their chemical compositions and/or type, said method comprising the steps of
  selecting a diatomaceous earth pigment, wherein said universal extender grind comprises from about 13 wt. % to about 30 wt. % of diatomaceous earth,
  selecting an aluminum silicate pigment, wherein said universal extender grind comprises from about 30 wt. % and about 60 wt. % of aluminum silicate, and
  selecting a third extender pigment,
  wherein the wt. % values are dry wt. %, and wherein the universal grind is usable in a plurality of paint compositions comprising paints having different tintable bases and at least flat, eggshell and semi-gloss finishes, wherein the flat finish measures from 0 to 10 gloss value at 60°, the eggshell finish measures from 10 to 35 sheen value at 85° and the semi-gloss finish measures from 35 to 70 gloss value at 60°.

25. The method of claim 24, wherein the third extender pigment comprises a calcium carbonate.

26. The method of claim 24, wherein various amounts of said universal grind can be admixed with an optional opacifying pigment grind and an aqueous film forming resin solution to manufacture the plurality of paint compositions to adjust the gloss or sheen of the plurality of paint compositions.

* * * * *